United States Patent
Hao et al.

(10) Patent No.: US 10,961,971 B2
(45) Date of Patent: Mar. 30, 2021

(54) SYSTEM AND METHOD FOR REDUCING COLD START EMISSIONS OF A MOTOR VEHICLE

(71) Applicant: GM Global Technology Operations LLC, Detroit, MI (US)

(72) Inventors: Lei Hao, Troy, MI (US); Wei Zeng, Oakland Township, MI (US); Chandra Namuduri, Troy, MI (US); Sharon Xiaobin Li, Bloomfield Hills, MI (US); Michael C. Zumbaugh, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/520,905

(22) Filed: Jul. 24, 2019

(65) Prior Publication Data

US 2021/0025364 A1    Jan. 28, 2021

(51) Int. Cl.
*F02D 41/30* (2006.01)
*F02N 11/08* (2006.01)
*F02D 41/06* (2006.01)

(52) U.S. Cl.
CPC ........ *F02N 11/0859* (2013.01); *F02D 41/064* (2013.01); *F02N 11/0814* (2013.01); *F02D 2200/0406* (2013.01); *F02D 2200/0602* (2013.01); *F02D 2200/101* (2013.01); *F02D 2200/60* (2013.01); *F02N 2200/022* (2013.01); *F02N 2200/10* (2013.01)

(58) Field of Classification Search
CPC ............. F02N 11/0859; F02N 11/0814; F02N 2200/022; F02N 2200/10; F02D 41/064; F02D 2200/0602; F02D 2200/101; F02D 2200/60; F02D 2200/0406
USPC ......... 123/179.3, 179.4, 179.17, 179.25, 491
See application file for complete search history.

(56) References Cited

U.S. PATENT DOCUMENTS

| 9,488,093 | B2* | 11/2016 | Ruhland | F02D 41/3023 |
| 10,174,704 | B2* | 1/2019 | Yang | F02M 55/025 |
| 2006/0180112 | A1* | 8/2006 | Katayama | F02D 41/065 |
| | | | | 123/179.4 |
| 2007/0175454 | A1* | 8/2007 | Shimazaki | F02D 41/406 |
| | | | | 123/497 |
| 2014/0172274 | A1* | 6/2014 | Douglas | F02D 41/064 |
| | | | | 701/104 |
| 2017/0175657 | A1* | 6/2017 | Fei | F02D 41/064 |

* cited by examiner

*Primary Examiner* — Gonzalo Laguarda
(74) *Attorney, Agent, or Firm* — Vivacqua Crane

(57) ABSTRACT

The present disclosure provides a system for reducing cold start emissions of a motor vehicle. A brushless DC motor is coupled to an engine for cranking the engine. In response to receiving a cold start signal from a cold start actuator, the motor controller activates the brushless DC motor to crank the engine for a cold start duration and increase fuel pressure. In response to a motor controller receiving an auto start signal from an auto start actuator, the motor controller activates the brushless DC motor to crank the engine for an auto start duration that is shorter than the cold start duration. In response to determining that the cold start duration or the auto start duration has expired, an engine controller activates the fuel delivery system to deliver fuel to the engine.

20 Claims, 2 Drawing Sheets

SYSTEM AND METHOD FOR REDUCING COLD START EMISSIONS OF A MOTOR VEHICLE

INTRODUCTION

The present disclosure relates to a brushless DC motor for a motor vehicle, and more particularly to a system and method of using a brushless DC motor to reduce cold start emissions, increase combustion efficiency, and smooth transition from start of the engine to its normal operation.

Modern vehicles can include auto start-stop systems that automatically shut down and restart the engine to reduce the time that the engine is idling, which in turn reduces the associated fuel consumption and vehicle emissions. A cold start can be the first start of the engine after the engine had been shut off and cold soaking for a period of time, such that the temperatures of all engine components are close to environment temperature and the fuel pressure is less than a predetermined injection pressure necessary for efficient combustion. An auto start can be an automatic restart or auto start of the engine after the engine had been previously started and shut down, such that the engine components may be at or near operating temperatures and the fuel pressure may be at or near the predetermined injection pressure.

Motor vehicles have brushed starters that are capable of cranking the engine only up to approximately 150 to 250 RPM for starting the engine. At these speeds, two or three engine cranking cycles may be required during a cold start to increase fuel pressure to the predetermined injection pressure necessary for starting the engine. Furthermore, while rich combustion during a cold start may be useful for reliably starting the engine, the rich combustion consumes more fuel and produces more vehicle emissions than combustion for an engine already at its normal operating temperature with fuel pressure already at the predetermined injection pressure. It is known that about 30% of a vehicle's total hydrocarbon and NOx emissions can be produced during these start cycles.

Thus, while current brushed starters achieve their intended purpose, there is a need for a new and improved system and method that addresses these issues.

SUMMARY

According to several aspects, a system for reducing cold start emissions for a motor vehicle is provided. The system includes an internal combustion engine and a brushless DC motor, which is coupled to the engine for cranking the same. The system further includes a fuel delivery system coupled to the engine to deliver fuel to the same, and the engine is configured to drive the fuel delivery system for increasing fuel pressure. The system further includes a cold start actuator configured to generate a cold start signal and an auto start actuator configured to generate an auto start signal. A motor controller is coupled to the brushless DC motor for activating the same. The motor controller is further coupled to the cold start actuator for receiving the cold start signal from the cold start actuator, and the motor controller is further coupled the auto start actuator for receiving the auto start signal from the auto start actuator. The system further includes an engine controller coupled to the cold start actuator to receive the cold start signal from the cold start actuator, and the engine controller is further coupled to the auto start actuator to receive the auto start signal from the auto start actuator. The engine controller further coupled to the fuel delivery system. In response to the motor controller receiving the cold start signal, the motor controller activates the brushless DC motor to crank the engine for a cold start duration and drive the fuel delivery system to increase the fuel pressure. In response to the engine controller further determining that the cold start duration has expired, the engine controller activates the fuel delivery system to begin delivering fuel to the engine. In response to the motor controller receiving the auto start signal, the motor controller is configured to activate the brushless DC motor to crank the engine for an auto start duration that is shorter than the cold start duration. In response to the engine controller further determining that the auto start duration has expired, the engine controller activates the fuel delivery system to begin delivering fuel to the engine.

In one aspect, the brushless DC motor is configured to crank the engine to at least 340 RPM.

In another aspect, the motor controller is configured to activate the brushless DC motor to crank the engine for at least 0.6 seconds during the cold start duration.

In another aspect, the motor controller is configured to activate the brushless DC motor to crank the engine for a length of time in the range between 0.2 and 0.5 seconds during the auto start duration.

In another aspect, the cold start actuator includes at least one of: an ignition coupled to the motor controller and configured to receive a key that is capable of turning to a start position for generating the cold start signal; and a start button capable of being activated while a fob transmits an enable signal to the motor controller.

In another aspect, the auto start actuator is an auto start-stop system configured to generate the auto start signal in response to detecting at least one restart condition.

According to several aspects, a system for reducing cold start emissions for a motor vehicle is provided. The system includes an internal combustion engine and a brushless DC motor, which is coupled to the engine for cranking the same. The system further includes a fuel delivery system coupled to the engine to deliver fuel to the same. The engine is configured to drive the fuel delivery system for increasing fuel pressure. The system further includes a cold start actuator configured to generate a cold start signal and an auto start actuator configured to generate an auto start signal. A motor controller is coupled to the brushless DC motor for activating the same. The motor controller is further coupled to the cold start actuator for receiving the cold start signal from the cold start actuator, and the motor controller is further coupled the auto start actuator for receiving the auto start signal from the auto start actuator. The system further includes an engine controller coupled to the cold start actuator to receive the cold start signal from the cold start actuator, and the engine controller is further coupled to the auto start actuator to receive the auto start signal from the auto start actuator. The engine controller further coupled to the fuel delivery system. In response to the motor controller receiving the cold start signal, the motor controller activates the brushless DC motor to crank the engine for a cold start duration and drive the fuel delivery system to increase the fuel pressure. In response to the motor controller further determining that the cold start duration has expired, the engine controller activates the fuel delivery system to begin delivering fuel to the engine. In response to the motor controller receiving the auto start signal, the motor controller activates the brushless DC motor to crank the engine for an auto start duration that is shorter than the cold start duration. In response to the motor controller further determining that the auto start duration has expired, the engine controller activates the fuel delivery system to begin delivering fuel to the engine. The system further includes one or more sensors for measuring associated parameters and activating the fuel delivery system to provide a predetermined fuel-air ratio based on a fuel map or lookup table and the measured parameters. In this example, the system includes a fuel pressure sensor, which is coupled to the fuel delivery system for measuring the fuel pressure. The system further includes an air intake system coupled to the engine, and the air intake system includes a throttle movable between open and closed positions to control manifold absolute pressure. The system further includes a MAP sensor coupled to the air intake system for measuring the manifold absolute pressure. The engine controller is coupled to the fuel pressure sensor to receive the fuel pressure measurement and the MAP sensor to receive the manifold absolute pressure measurement. The engine controller activates the fuel delivery system to provide an adjusted fuel amount to mix with the air intake and provide a low-emission fuel-air ratio corresponding with the fuel pressure measurement and the manifold absolute pressure measurement.

In one aspect, the system is configured to smooth the transition from start of the engine to its normal operation. In this example, the system further includes an engine speed sensor coupled to the engine for measuring an engine speed, and the engine controller is coupled to the engine speed sensor to receive an engine speed measurement. The engine controller is configured to compare the engine speed measurement to an upper speed threshold. In response to the engine controller determining that the engine speed measurement is above the upper speed threshold, the engine controller activates the fuel delivery system to deliver an adjusted fuel amount to the engine, where the adjusted fuel amount is less than the current fuel amount being supplied to the engine.

In another aspect, the engine controller is configured to compare the engine speed measurement to a lower speed threshold. In response to the engine controller determining that the engine speed measurement is below the lower speed threshold, the engine controller activates the fuel delivery system to deliver an adjusted fuel amount to the engine, where the adjusted fuel amount is more than the current fuel amount being supplied to the engine.

In another aspect, the brushless DC motor is configured to crank the engine to at least 340 RPM.

In another aspect, the motor controller is configured to activate the brushless DC motor to crank the engine for at least 0.6 seconds during the cold start duration.

In another aspect, the motor controller is configured to activate the brushless DC motor to crank the engine for a length of time in the range between 0.2 and 0.5 seconds during the auto start duration.

In another aspect, the cold start actuator includes at least one of: an ignition coupled to the motor controller and configured to receive a key that is capable of turning to a start position for generating the cold start signal; and a start button capable of being activated while a fob transmits an enable signal to the motor controller.

In another aspect, the auto start actuator is an auto start-stop system configured to generate the auto start signal in response to detecting at least one restart condition.

According to several aspects, a method for reducing cold start emissions for a motor vehicle is provided. The method includes a receiving, with a motor controller, one of a cold start signal generated by a cold start actuator and an auto start signal generated by an auto start actuator. In response to the motor controller receiving the cold start signal, the motor controller activates a brushless DC motor to crank the engine for a cold start duration and increase fuel pressure. In response to the motor controller further determining that the cold start duration has expired, the motor controller activates a fuel delivery system to begin delivering fuel to the engine. In response to the motor controller receiving the auto start signal, the motor controller activating the brushless DC motor to crank the engine for an auto start duration that is shorter than the cold start duration. In response to the motor controller further determining that the auto start duration has expired, the engine controller activates the fuel delivery system to begin delivering fuel to the engine.

In one aspect, the method further includes generating the auto start signal in response to an auto start-stop system detecting at least one restart condition. The method further includes generating the cold start signal in response to at least one of: an ignition receiving a key with the key capable of turning to a start position; and a start button being activated while a fob transmits an enable signal to the motor controller.

In another aspect, the method includes smoothing a transition of the start of to its normal operation and reduce fuel consumption and engine-out emissions. In this example, the method includes an engine speed sensor measuring an engine speed and the engine controller comparing the engine speed measurement to an upper speed threshold. In response to the engine controller determining that the engine speed measurement is above the upper speed threshold, the engine controller activates the fuel delivery system to deliver an adjusted fuel amount to the engine, where the adjusted fuel amount is less than the current fuel amount.

In another aspect, the method includes the engine speed sensor measuring the engine speed and the engine controller comparing the engine speed measurement to a lower speed threshold. In response to the engine controller determining that the engine speed measurement is below the lower speed threshold, the engine controller activates the fuel delivery system to deliver an adjusted fuel amount to the engine, where the adjusted fuel amount is greater than the current fuel amount.

In another aspect, the method includes the motor controller activating the brushless DC motor to crank the engine for at least 0.6 seconds during the cold start duration.

In another aspect, the method includes the motor controller activating the brushless DC motor to crank the engine for a length of time in the range between 0.2 and 0.5 seconds during the auto start duration.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
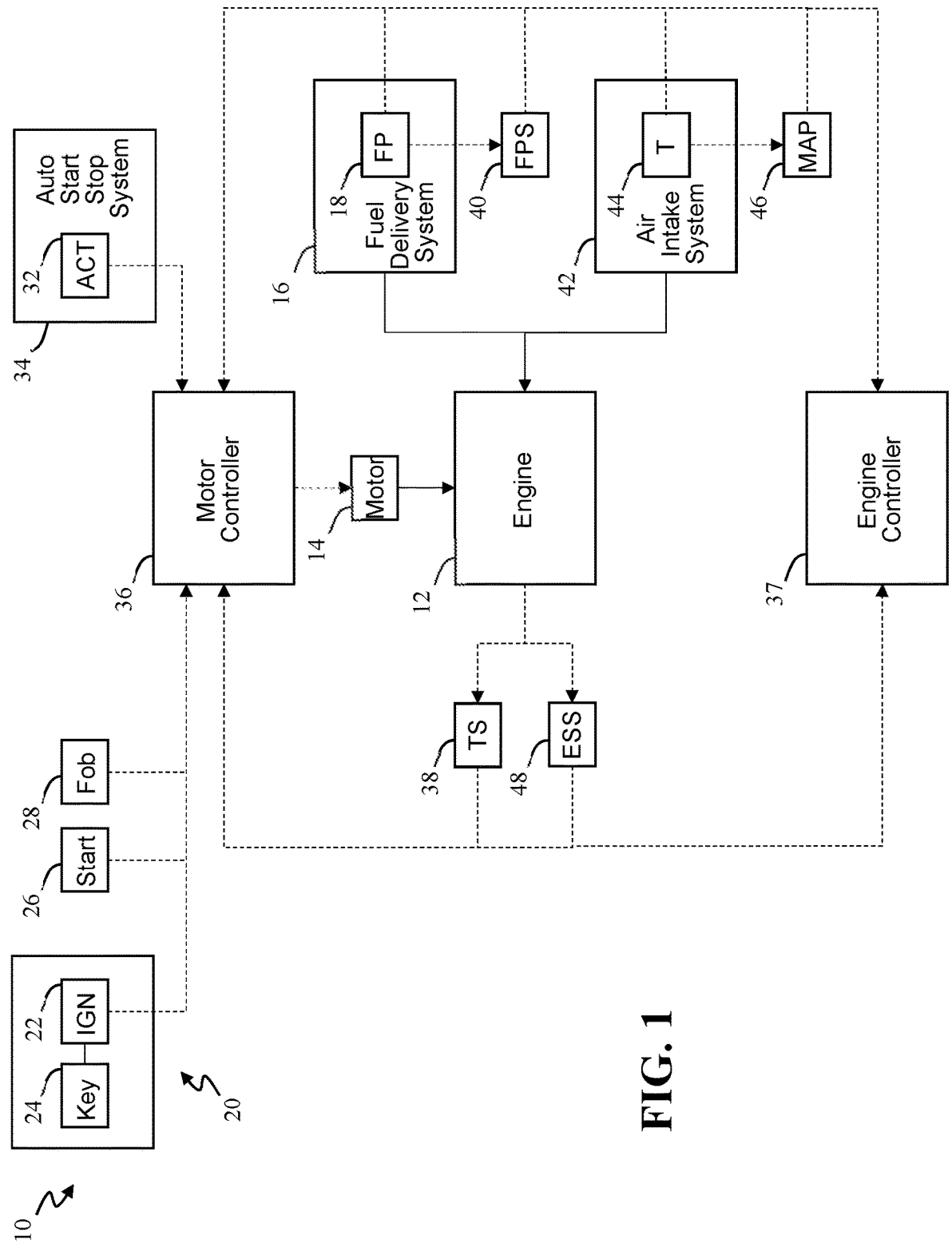
FIG. 1 is a schematic view of a system for reducing cold start emissions and controlling fuel consumption of a motor vehicle.

Referring to FIG. 1, there is illustrated a system 10 for reducing cold start emissions, increasing combustion efficiency, and smoothing the transition from the start of the engine to its normal operation. The system 10 includes an internal combustion engine 12 and a brushless DC motor 14, which is coupled to the engine 12 and configured to crank the engine 12. The system 10 further includes an auto start-stop system 34 that automatically shuts down and restarts the engine 12 based on various conditions. As will be described in detail below, during a cold start when the fuel pressure is below the predetermined injection pressure for starting the engine 12, the brushless DC motor 14 cranks the engine for a cold start duration to increase fuel pressure to the predetermined injection pressure. During an auto start, the brushless DC motor 14 cranks the engine 12 for an auto start duration that is shorter than the cold start duration because the fuel pressure remains at or near the predetermined injection pressure while the engine 12 is temporarily shut down.

The brushless DC motor 14 can be configured to crank the engine 12 to at least 340 RPM for a predetermined period of time to increase the fuel pressure to a predetermined injection pressure during cold start conditions. In this way, during a cold start, the engine 12 can increase engine cranking speed and torque and enable a higher fuel pressure, enhancing combustion to achieve lower emissions and less fuel consumption. However, it is contemplated that the brushless DC motor 14 can be configured to crank the engine 12 above 340 RPM.

The system 10 further includes a fuel delivery system 16 coupled to the engine 12, and the fuel delivery system 16 includes a fuel pump 18 configured to deliver fuel to the engine 12. In this example, the brushless DC motor 14 cranks the engine 12, which is coupled to the fuel pump 18 for driving the fuel pump 18 to increase fuel pressure to the predetermined injection pressure required for combustion. The fuel pressure has a direct relationship to the cranking speed and the length of time that the brushless DC motor cranks the engine 12.

The system 10 further includes one or more cold start actuators 20 configured to generate a cold start signal to indicate a cold start of the engine 12. One example of the cold start actuator 20 includes an ignition 22 configured to receive a key 24, with the key capable of turning to a start position for generating the cold start signal. Another example of the cold start actuator 20 includes a start button 26 capable of being pushed to generate the cold start signal while a nearby fob 28 transmits an enable signal. It is contemplated that the cold start actuator can be other suitable user-operated control devices that are manipulated by a user to start the engine. In addition, as described below, it is contemplated that the cold start actuator can be replaced by or used in combination with one or more sensors, such as a temperature sensor, configured to detect whether the start of the engine was a cold start or an auto start.

The system 10 further includes an auto start actuator 32 configured to generate an auto start signal to indicate that the start of an engine 12 was a restart or an auto start, when fuel pressure remains near or above the predetermined injection pressure. The auto start actuator 32 can be a component of an auto start-stop system 34 configured to restart a recently shutdown engine in response to detecting one or more restart conditions associated with, for example, engine speed, vehicle speed, and brake pressure. As described below, it is contemplated that the cold start actuator can be replaced by or used in combination with one or more sensors, such as a temperature sensor, configured to detect the auto start.

The system 10 further includes a motor controller 36 coupled to the brushless DC motor 14 for activating the same. The motor controller 36 is further coupled to the cold start actuator 20 for receiving the cold start signal from the cold start actuator 20, and the motor controller 36 is further coupled the auto start actuator 32 for receiving the auto start signal from the auto start actuator 32. The motor controller 36 can be an engine control module (ECM) or engine control unit (ECU), such as an electronic engine management system (EEMS).

The system 10 further includes an engine controller 37 coupled to the cold start actuator 20 to receive the cold start signal from the cold start actuator 20, and the engine controller 37 is further coupled to the auto start actuator 32 to receive the auto start signal from the auto start actuator 32. The engine controller 37 further coupled to the fuel delivery system.

In response to the motor controller 36 receiving the cold start signal, the motor controller 36 activates the brushless DC motor 14 to crank the engine 12 for a cold start duration and drive the fuel delivery system 16 to increase the fuel pressure to the predetermined injection pressure. In this example, the motor controller 36 activates the brushless DC motor 14 to cranks the engine 12 at 340 RPM for 0.6 or more seconds. In response to the motor controller 36 further determining that the cold start duration has expired, the engine controller 37 activates the fuel delivery system 16 to begin delivering fuel to the engine 12.

In response to the motor controller 36 receiving the auto start signal, the motor controller 36 activates the brushless DC motor 14 to crank the engine 12 for an auto start duration that is shorter than the cold start duration. In this example, the motor controller 36 activates the brushless DC motor to crank the engine 12 at 340 RPM for a length of time in the range between 0.2 and 0.5 seconds. In other embodiments, the auto start duration can be shorter than 0.2 seconds because the fuel pressure is at or above the predetermined injection pressure and the engine components are at or above their respective operating temperatures. However, it is contemplated that the auto start duration can be longer than 0.5 seconds. In response to the engine controller 37 further determining that the auto start duration has expired, the engine controller 37 activates the fuel delivery system 16 to begin delivering fuel to the engine 12.

In this example, the auto start actuator 32 and the cold start actuator 20 may be further used in combination with a temperature sensor 38 to determine whether the start of the engine 12 is a cold start or an auto start. The temperature sensor 38 may be configured to measure the temperature of the engine coolant. However, it is contemplated that the temperature sensor can measure the temperature of other engine fluids or components. The motor controller 36 is coupled to the temperature sensor 38 to receive a temperature measurement of the engine 12. The motor controller 36 is configured to compare the temperature measurement to a cold start temperature threshold and an auto start temperature threshold, which is higher than the cold start temperature threshold. In one example, the cold start temperature threshold is 40 degrees Fahrenheit, and the auto start temperature threshold is 195 degrees Fahrenheit. It is contemplated that the thresholds can be other suitable temperatures. In still another example, the auto start temperature threshold and the cold start temperature threshold can be a single or common temperature.

In response to the motor controller 36 determining that the temperature measurement is below the cold start temperature threshold, the motor controller 36 determines that the start of the engine was a cold start, and the motor controller 12 activates the brushless DC motor 14 to crank the engine 12 for the cold start duration to increase the fuel pressure to the predetermined injection pressure. The cold start duration is longer than the auto start duration because the longer cranking time increases fuel pressure. In this example, the motor controller 36 may activate the brushless DC motor 14 to crank the engine 12 at 340 RPM or higher for a duration of 0.6 or more seconds in response to the motor controller determining that the measured temperature is below 40 degrees Fahrenheit. However, it is contemplated that the cold start duration can be shorter than 0.6 seconds, and the cold temperature threshold can be above or below 40 degrees Fahrenheit. In response to the motor controller 36 further determining that the cold start duration expired, the engine controller 37 activates the fuel delivery system 16 to begin delivering fuel to the engine 12 based upon a fuel map or lookup table and the measured parameters of the vehicle.

In response to the motor controller 36 determining that the temperature measurement is above the auto start temperature threshold, the motor controller 36 activates the brushless DC motor 14 to crank the engine 12 for the auto start duration. Continuing with the previous example, in response to the motor controller 36 determining that the measured temperature is above 145 degrees Fahrenheit, the brushless DC motor cranks the engine at 340 RPM for a length of time in the range between 0.2 and 0.5 seconds. However, it is contemplated that the motor controller 36 can activate the brushless DC motor to crank the engine at a speed higher or lower than 340 RPM for any suitable length of time based on other measured temperatures. In response to the motor controller 36 further determining that the auto start duration expired, the engine controller 37 activates the fuel delivery system 16 to begin delivering fuel to the engine 12. Other embodiments of the system may detecting a cold start or an auto start by using only the auto start actuator 32 and the cold start actuator 20, to the exclusion of any additional sensors, e.g. the temperature sensor.

Continuing with the previous examples, the system 10 further includes a plurality of sensors that cooperate with the engine controller 37 to activate the fuel delivery system 16 to provide a desired fuel-air ratio based on a fuel map or lookup table and the measured parameters. In this example, the system 10 includes a fuel pressure sensor 40 coupled to the fuel delivery system 16 for measuring the fuel pressure. The system 10 further includes an air intake system 42 coupled to the engine 12. The air intake system 42 includes a throttle 44 movable between open and closed positions to control manifold absolute pressure, and the system 10 includes a MAP sensor 46 coupled to the air intake system 42 for measuring the manifold absolute pressure. The motor controller 36 is coupled to the fuel pressure sensor 40 to receive the fuel pressure measurement and the MAP sensor 46 to receive the manifold absolute pressure measurement. The engine controller 37 activates the fuel delivery system 16 to provide an adjusted amount of fuel to mix with the air intake and provide a low-emission fuel-air ratio, which corresponds with a fuel map or lookup table correlating fuel-air ratio values with fuel pressure measurements and manifold absolute pressure measurements.

The system 10 smooths the transition from the start of the engine to its normal operation by controlling the speed of the engine within a predetermined range of engine speeds. In particular, the system 10 includes an engine speed sensor 48 coupled to the engine 12 for measuring an engine speed, and the engine controller 37 is coupled to the engine speed sensor 48 for receiving an engine speed measurement. The engine controller 37 is configured to compare the engine speed measurement to an upper speed threshold. In response to the engine controller 37 determining that the engine speed measurement is above the upper speed threshold, the engine controller 37 activates the fuel delivery system 16 to deliver an adjusted fuel amount to the engine 12 where the adjusted fuel amount is less than the current amount of fuel being supplied to the engine 12. In this example, the upper speed threshold can be 1,650 RPM. However, it is contemplated that the upper speed threshold can be any speed associated with a desired smoothness of transition from engine start to normal operation. As just one example, the upper speed threshold can correspond with a smoothness of transition associated with the displacement of the engine or other suitable parameter.

The engine controller 37 is further configured to compare the engine speed measurement to a lower speed threshold. In response to the engine controller 37 determining that the engine speed measurement is below the lower speed threshold, the engine controller 37 activates the fuel delivery system 16 to deliver an adjusted fuel amount to the engine 12 where the adjusted fuel amount is more than the current amount of fuel being supplied to the engine 12. In this example, the lower speed threshold can be 1,340 RPM. However, it is contemplated that the upper speed threshold can be any speed corresponding with a desired smoothness associated with the displacement of the engine or other suitable parameter.

The system 10 also includes a plurality of sensors measuring various parameters, and the engine controller 37 is configured to activate the fuel delivery system 16 and the air intake system 42 based on the measured parameters. In one example, the engine controller 37 is coupled to the MAP sensor 46 to receive a manifold absolute pressure measurement and the fuel pressure sensor 40 to receive a fuel pressure measurement. The engine controller 37 activates the fuel delivery system 16 to provide a current amount of fuel to mix with the air intake and provide a low-emission fuel-air ratio. However, it is contemplated that the system may include other suitable sensors for measuring any suitable parameter, such that the engine controller can activate the fuel delivery system to provide a low-emission fuel-air ratio corresponding with those measured parameters.

The engine controller 37 is coupled to the engine speed sensor 48 to receive an engine speed measurement. The engine controller 37 is configured to compare the engine speed measurement to an upper speed threshold. In one example, the upper speed threshold is 1,650 RPM. However, it is contemplated that the upper speed threshold can be above or below 1,650 RPM. In response to the engine controller 37 determining that the engine speed measurement is above the upper speed threshold, the engine controller 37 is further configured to activate the fuel delivery system 16 to deliver an adjusted fuel amount to the engine 12, where the adjusted fuel amount is less than the fuel amount currently supplied to the engine.

The engine controller 37 is further configured to compare the engine speed measurement to a lower speed threshold. In this example, the lower speed threshold is 1,340 RPM. However, it is contemplated that the lower speed threshold can be above or below 1,340 RPM. In response to the engine controller 37 determining that the engine speed measurement is below the lower speed threshold, the engine controller 37 is also configured to activate the fuel delivery system 16 to deliver an adjusted fuel amount to the engine 12, where the adjusted fuel amount is greater than the fuel amount currently supplied to the engine 12.

Figure 2:
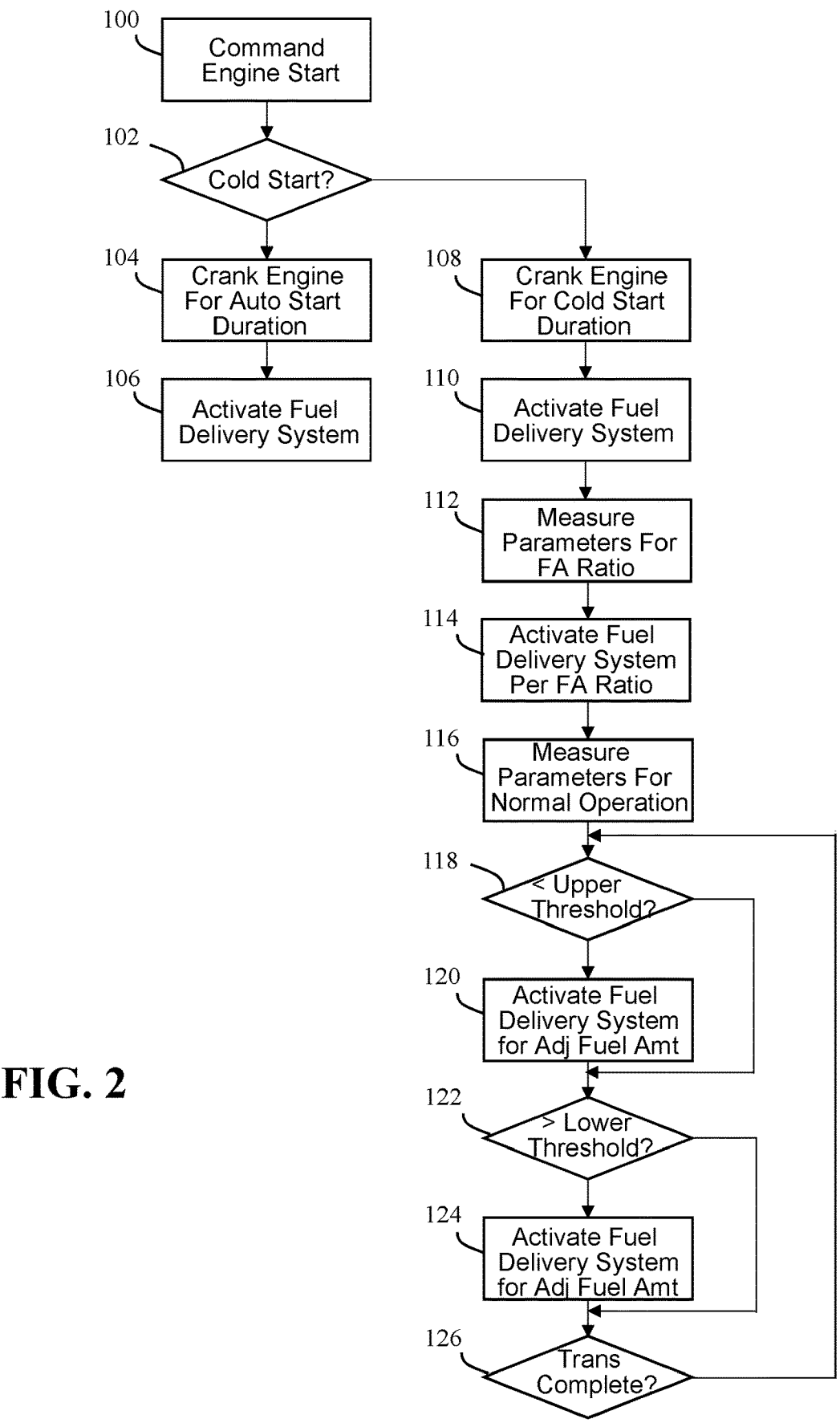
FIG. 2 is a flowchart of a method of reducing cold start emissions and controlling fuel consumption of a motor vehicle.

Referring to FIG. 2, there is shown a method for using the system 10 of FIG. 1 to reduce cold start emissions, increase combustion efficiency, and smooth the transition from the start of the engine to its normal operation. At step 100, the method begins with the step of commanding the engine 12 to start, such that the motor controller 36 receives one of a cold start signal or an auto start signal. In a cold start condition, this step can be accomplished by inserting a key into the ignition and turning the same to a start position so as to generate the cold start signal. The cold start signal can also be generated in response to the combination of a start button being pushed while a key fob wirelessly transmits an enable signal to the motor controller. In auto start conditions, this step can be accomplished by an auto start-stop system generating the auto start signal to restart the engine 12 based on one or more detected restart conditions related to engine speed, vehicle speed, brake pressure, or other suitable parameters.

At step 102, the motor controller 36 determines whether the engine 12 is being started in cold start conditions where fuel pressure is below the predetermined injection pressure necessary for efficient combustion. In this example, the motor controller 36 determines that the engine is being started in cold start conditions if a key 24 was received in the ignition 22 and turned to the start position or a start button was pressed. The motor controller 36 can also determine that the engine is being started in cold start conditions when the temperature of the engine 12 is below a cold start temperature threshold. It is contemplated that the motor controller can determine that the engine is being started in cold start conditions when the motor controller receives a cold start signal from any suitable cold start actuator, sensor, or combinations thereof. If the motor controller 36 determines that the engine is not being started in a cold start, the motor controller determines that the engine is being restarted in an auto start conditions while fuel pressure remains at or near the predetermined injection pressure, and the method proceeds to step 104. If the motor controller 36 determines that the engine 12 is being started in a cold start, the method proceeds to step 108. It is contemplated that the motor controller 36 can determine whether the engine is being commanded to start in the cold start condition by other suitable steps.

At step 104, the motor controller 36 activates the brushless DC motor 14 to crank the engine 12 at the predetermined speed for the auto start duration. In this example, the brushless DC motor 14 cranks the engine 12 to at least 340 RPM for a length of time in the range between 0.2 and 0.5 seconds. It is contemplated that the brushless DC motor can crank the engine to other speeds for any length of time during an auto start.

At step 106, the engine controller 37 activates the fuel delivery system 16 to begin delivering fuel to the engine 12, in response to the motor controller 36 determining that the auto start duration expired. The motor controller 36 discontinues activating the brushless DC motor 14 when the engine 12 begins operating on its own in response to combustion of fuel-air mixture.

At step 108, the motor controller 36 activates the brushless DC motor 14 to crank the engine 12 for the cold start duration for increasing the fuel pressure. The cold start duration is longer than the auto start duration because the brushless DC motor can crank the engine 12 to drive the fuel pump 18 to increase fuel pressure to the predetermined injection pressure. During an auto start, fuel pressure does not need to be increased because it remains at or near the predetermined injection pressure during throughout the stop-start process. Continuing with the previous example, the brushless DC motor 14 cranks the engine 12 to at least 340 RPM for at least 0.6 seconds. However, it is contemplated that the brushless DC motor can crank the engine to other speeds for any length of time during a cold start.

At step 110, the engine controller 37 activates the fuel delivery system 16 to begin delivering a current fuel amount to the engine 12. For example, the engine controller 37 can activate the fuel delivery system 16 to inject an amount of fuel based on the fuel pressure and the measured manifold air pressure. The engine controller 37 also discontinues activating the brushless DC motor 14 when the engine 12 begins operating on its own in response to the combustion of fuel-air mixture.

At step 112, one or more sensors measure parameters used by the engine controller for commanding a fuel-air ratio that starts the engine with efficient combustion while reducing emissions. In this example, the fuel pressure sensor 40 measures a current fuel pressure of the fuel delivery system 16. The MAP sensor 46 measures the manifold absolute pressure of the air intake system 42. The system 10 may include other sensors, such as a MAF sensor, configured to measure other parameters used by the engine controller for commanding the corresponding fuel-air ratio that starts the engine and reduces emissions.

At step 114, the engine controller 37 activates the fuel delivery system 16 to provide the current fuel amount to mix with the air intake and provide a low-emission fuel-air ratio corresponding with the fuel pressure measurement and the manifold absolute pressure measurement. However, the engine controller can activate the fuel delivery system to provide a fuel-air ratio corresponding with other parameters measured by any sensor.

At step 116, one or more sensors are used to measure parameters indicative of the transition from the start of the engine to its normal operation. In this example, the engine speed sensor 48 measures the speed of the engine 12.

At step 118, the engine controller 37 compares the measured parameter with an upper predetermined threshold to determine whether the engine is currently operating within a predetermined speed profile associated with the transition of the engine from start to normal operation. In particular, continuing with the previous example, the engine controller 37 compares the engine speed measurement to the upper speed threshold of 1,650 RPM. If the engine controller 37 determines that the engine speed measurement is above the upper speed threshold, the method proceeds to step 120. If the engine controller 37 determines that the engine speed measurement is not above the upper speed threshold, the method immediately proceeds to step 122.

At step 120, the engine controller 37 activates the fuel delivery system 16 to deliver an adjusted fuel amount to the engine 12, where the adjusted fuel amount is less than the amount of fuel currently supplied to the engine 12.

At step 122, the engine controller 37 compares the measured parameter with a lower predetermined threshold to determine whether the engine is currently operating within the predetermined speed profile associated with the transition of the engine from start to normal operation. Continuing still with the previous example, the engine controller 37 compares the engine speed measurement to the lower speed threshold of 1,340 RPM. If the engine controller 37 determines that the engine speed measurement is below the lower speed threshold, the method proceeds to step 124. If the engine controller 37 determines that the engine speed measurement is not below the lower speed threshold, the method can immediately proceed to step 126.

At step 124, the engine controller 37 activates the fuel delivery system 16 to deliver an adjusted fuel amount to the engine 12, where the adjusted fuel amount is more than the amount of fuel currently supplied to the engine 12.

At step 126, the motor controller determines whether the transition from the start of the engine to its normal operation is complete. If the transition is not complete, the method returns to step 118. If the transition is complete, the method terminates and an open loop control method for normal operation of the engine can be initiated.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A system for reducing cold start emissions for a motor vehicle, the system comprising:
    an internal combustion engine;
    a brushless DC motor coupled to the engine and configured to crank the engine;
    a fuel delivery system coupled to the engine and configured to deliver fuel to the engine, wherein the engine drives the fuel delivery system to increase a fuel pressure;
    a cold start actuator configured to generate a cold start signal;
    an auto start actuator configured to generate an auto start signal;
    a motor controller coupled to the brushless DC motor, wherein the motor controller is further coupled to the cold start actuator to receive the cold start signal from the cold start actuator, and wherein the motor controller is further coupled to the auto start actuator to receive the auto start signal from the auto start actuator; and
    an engine controller coupled to the cold start actuator to receive the cold start signal from the cold start actuator, wherein the engine controller is further coupled to the auto start actuator to receive the auto start signal from the auto start actuator, and wherein the engine controller is further coupled to the fuel delivery system;
    wherein, in response to the motor controller receiving the cold start signal, the motor controller is configured to activate the brushless DC motor to crank the engine for a cold start duration and drive the fuel delivery system to increase the fuel pressure, and in response to the engine controller further determining that the cold start duration has expired, the engine controller activates the fuel delivery system to begin delivering fuel to the engine;
    wherein, in response to the motor controller receiving the auto start signal, the motor controller is configured to activate the brushless DC motor to crank the engine for an auto start duration that is shorter than the cold start duration, and in response to the engine controller further determining that the auto start duration has expired, the engine controller activates the fuel delivery system to begin delivering fuel to the engine.

2. The system of claim 1 wherein the brushless DC motor is configured to crank the engine to at least 340 RPM.

3. The system of claim 2 wherein the motor controller is configured to activate the brushless DC motor to crank the engine for at least 0.6 seconds to increase the fuel pressure to a predetermined injection pressure during the cold start duration.

4. The system of claim 3 wherein the motor controller is configured to activate the brushless DC motor to crank the engine for a length of time in a range between 0.2 and 0.5 seconds during the auto start duration.

5. The system of claim 4 wherein the cold start actuator comprises at least one of:
    an ignition coupled to the motor controller and configured to receive a key capable of turning to a start position; and
    a start button being activated while a fob transmits an enable signal to the motor controller.

6. The system of claim 5 wherein the auto start actuator is an auto start-stop system configured to generate the auto start signal in response to detecting at least one restart condition.

7. A system for reducing cold start emissions for a motor vehicle, the system comprising:
    an internal combustion engine;
    a brushless DC motor coupled to the engine and configured to crank the engine;
    a fuel delivery system coupled to the engine and configured to deliver a current fuel amount to the engine, wherein the engine drives the fuel delivery system to increase a fuel pressure;
    a cold start actuator configured to generate a cold start signal;
    an auto start actuator configured to generate an auto start signal;
    a motor controller coupled to the brushless DC motor, wherein the motor controller is further coupled to the cold start actuator to receive the cold start signal from the cold start actuator, and wherein the motor controller is further coupled to the auto start actuator to receive the auto start signal from the auto start actuator;
    an engine controller coupled to the cold start actuator to receive the cold start signal from the cold start actuator, wherein the engine controller is further coupled to the auto start actuator to receive the auto start signal from the auto start actuator, and wherein the engine controller further coupled to the fuel delivery system;
    wherein, in response to the motor controller receiving the cold start signal, the motor controller is configured to activate the brushless DC motor to crank the engine for a cold start duration and drive the fuel delivery system to increase the fuel pressure, and in response to the motor controller further determining that the cold start duration has expired, the engine controller activates the fuel delivery system to begin delivering fuel to the engine;
    wherein, in response to the motor controller receiving the auto start signal, the motor controller is configured to activate the brushless DC motor to crank the engine for an auto start duration that is shorter than the cold start duration, and in response to the engine controller further determining that the auto start duration has expired, the engine controller activates the fuel delivery system to begin delivering fuel to the engine;
    a fuel pressure sensor coupled to the fuel delivery system for measuring the fuel pressure;
    an air intake system coupled to the engine, wherein the air intake system includes a throttle movable between open and closed positions to control a manifold absolute pressure; and
    a MAP sensor coupled to the air intake system for measuring the manifold absolute pressure;
    wherein the engine controller is coupled to the fuel pressure sensor to receive the fuel pressure measurement and the MAP sensor to receive the manifold absolute pressure measurement, and the engine controller is configured to activate the fuel delivery system to provide an adjusted fuel amount to mix with an air intake and provide a low-emission fuel-air ratio corresponding with the fuel pressure measurement and the manifold absolute pressure measurement.

8. The system of claim 7 further comprising an engine speed sensor coupled to the engine for measuring an engine speed, wherein the engine controller is coupled to the engine speed sensor to receive an engine speed measurement and the engine controller is configured to:
compare the engine speed measurement to an upper speed threshold; and
activate the fuel delivery system to deliver an adjusted fuel amount to the engine in response to the engine controller determining that the engine speed measurement is above the upper speed threshold, wherein the adjusted fuel amount is less than the current fuel amount.

9. The system of claim 7 further comprising an engine speed sensor coupled to the engine for measuring an engine speed, wherein the engine controller is coupled to the engine speed sensor to receive an engine speed measurement and the engine controller is configured to:
compare the engine speed measurement to a lower speed threshold; and
activate the fuel delivery system to deliver an adjusted fuel amount to the engine in response to the engine controller determining that the engine speed measurement is below the lower speed threshold, wherein the adjusted fuel amount is more than the current fuel amount.

10. The system of claim 7 wherein the brushless DC motor is configured to crank the engine to at least 340 RPM.

11. The system of claim 10 wherein the motor controller is configured to activate the brushless DC motor to crank the engine for at least 0.6 seconds to increase fuel pressure to a predetermined injection pressure during the cold start duration.

12. The system of claim 11 wherein the motor controller is configured to activate the brushless DC motor to crank the engine for a length of time in a range between 0.2 and 0.5 seconds during the auto start duration.

13. The system of claim 12 wherein the cold start actuator comprises at least one of:
an ignition coupled to the motor controller and configured to receive a key capable of turning to a start position; and
a start button being activated while a fob transmits an enable signal to the motor controller.

14. The system of claim 13 wherein the auto start actuator is an auto start-stop system configured to generate the auto start signal in response to detecting at least one restart condition.

15. A method for reducing cold start emissions for a motor vehicle having an internal combustion engine, the method comprising the steps of:

receiving, with a motor controller, one of a cold start signal generated by a cold start actuator and an auto start signal generated by an auto start actuator;
activating, using the motor controller, a brushless DC motor to crank the engine for a cold start duration and increase fuel pressure in response to the motor controller receiving the cold start signal, and activating a fuel delivery system to begin delivering fuel to the engine in response to the motor controller further determining that the cold start duration has expired; and
activating, using the motor controller, the brushless DC motor to crank the engine for an auto start duration that is shorter than the cold start duration in response to the motor controller receiving the auto start signal, and activating the fuel delivery system to begin delivering fuel to the engine in response to the motor controller further determining that the auto start duration has expired.

16. The method of claim 15 further comprising:
generating the auto start signal in response to an auto start-stop system detecting at least one restart condition; and
generating the cold start signal in response to at least one of:
receiving a key within an ignition of the motor vehicle and turning the key to a start position; and
activating a start button while transmitting, using a fob, an enable signal to the motor controller.

17. The method of claim 16 further comprising:
measuring, using an engine speed sensor, an engine speed;
comparing, using an engine controller, an engine speed measurement to an upper speed threshold; and
activating, using the engine controller, the fuel delivery system to deliver an adjusted fuel amount to the engine in response to the engine controller determining that the engine speed measurement is above the upper speed threshold, wherein the adjusted fuel amount is less than a current fuel amount.

18. The method of claim 16 further comprising:
measuring, using an engine speed sensor, an engine speed;
comparing, using an engine controller, an engine speed measurement to a lower speed threshold; and
activating, using the engine controller, the fuel delivery system to deliver an adjusted fuel amount to the engine in response to the engine controller determining that the engine speed measurement is below the lower speed threshold, wherein the adjusted fuel amount is more than a current fuel amount.

19. The method of claim 16 further comprising activating, using the motor controller, the brushless DC motor to crank the engine for at least 0.6 seconds during the cold start duration.

20. The method of claim 16 further comprising activating, using the motor controller, the brushless DC motor to crank the engine for a length of time in a range between 0.2 and 0.5 seconds during the auto start duration.

* * * * *